(12) United States Patent
Charge et al.

(10) Patent No.: US 12,391,103 B2
(45) Date of Patent: Aug. 19, 2025

(54) GLAZED DEVICE FOR A VEHICLE DOOR, COMPRISING A FLUSH-FITTED MOVABLE PANEL, AND CORRESPONDING DOOR

(71) Applicant: ADVANCED COMFORT SYSTEMS FRANCE SAS—ACS FRANCE, Bressuire (FR)

(72) Inventors: Philippe Charge, Bressuire (FR); Mickaël Desbois, Haute Goulaine (FR); Thierry Turc, Bressuire (FR)

(73) Assignee: ADVANCED COMFORT SYSTEMS FRANCE SAS—ACS FRANCE, Bressuire (FR)

( * ) Notice: Subject to any disclaimer, the term of this patent is extended or adjusted under 35 U.S.C. 154(b) by 0 days.

(21) Appl. No.: 18/706,393

(22) PCT Filed: Nov. 2, 2021

(86) PCT No.: PCT/EP2021/080382
§ 371 (c)(1),
(2) Date: May 1, 2024

(87) PCT Pub. No.: WO2023/078531
PCT Pub. Date: May 11, 2023

(65) Prior Publication Data
US 2024/0424878 A1 Dec. 26, 2024

(51) Int. Cl.
*B60J 10/76* (2016.01)
*B60J 10/34* (2016.01)
*E05D 15/16* (2006.01)

(52) U.S. Cl.
CPC .............. *B60J 10/76* (2016.02); *B60J 10/34* (2016.02); *E05D 15/165* (2013.01); *E05Y 2600/526* (2013.01); *E05Y 2900/55* (2013.01)

(58) Field of Classification Search
CPC ....... B60J 10/76; B60J 10/34; E05Y 2900/55; E05Y 2600/526; E05D 15/165
(Continued)

(56) References Cited

U.S. PATENT DOCUMENTS 4,483,100 A * 11/1984 Blankenburg ........... B60J 10/24
49/374
5,083,832 A * 1/1992 Ohya ....................... B60J 1/008
49/502
(Continued)

FOREIGN PATENT DOCUMENTS

| EP | 778168 A1 | 6/1997 |
| EP | 857844 A1 | 8/1998 |

(Continued)

*Primary Examiner* — Michael Mccullough
(74) *Attorney, Agent, or Firm* — S.J. Intellectual Property LTD.

(57) ABSTRACT

The invention relates to a glazed device intended to be mounted on an inner door shell to form a motor vehicle door or on a bodywork element, comprising a glazed fixed part and a mobile glazed panel that can slide relative to said fixed part along a substantially vertical axis, and can selectively at least partially cover or uncover an opening in said fixed part, said fixed panel being guided along rails supported by said fixed part. Said rails are secured to said fixed part along the side edges by a bead of glue, and a frame, which extends at least on the side edges and the upper edge of said opening, is secured to the rails for its side edges and is glued to said fixed part by means of said bead of glue, for its upper edge.

14 Claims, 13 Drawing Sheets

(58) Field of Classification Search
USPC .................................................. 49/413, 360
See application file for complete search history.

(56) References Cited

U.S. PATENT DOCUMENTS

| | | | | |
|---|---|---|---|---|
| 6,125,587 | A * | 10/2000 | Woods | B60J 1/1861 49/404 |
| 6,220,650 | B1 * | 4/2001 | Davis | B60J 10/78 296/146.16 |
| 6,223,470 | B1 * | 5/2001 | Millard | B60J 5/107 49/374 |
| 6,260,905 | B1 * | 7/2001 | Wagner | B60J 1/1861 49/374 |
| 6,422,638 | B1 * | 7/2002 | Carnaghi | B60J 1/1861 49/374 |
| 6,880,293 | B2 * | 4/2005 | Ishikawa | E05F 11/385 49/428 |
| 7,083,220 | B2 * | 8/2006 | Suzuki | B60J 1/1861 296/146.16 |
| 8,246,101 | B2 * | 8/2012 | Cicala | B60J 1/1861 296/146.16 |
| 8,650,802 | B2 * | 2/2014 | Grudzinski | B60J 10/7775 49/502 |
| 9,211,780 | B2 * | 12/2015 | Lahnala | B60J 10/70 |
| 9,308,801 | B2 * | 4/2016 | Lahnala | B60J 10/76 |
| 10,562,385 | B2 * | 2/2020 | Krause | B60J 10/79 |
| 11,299,019 | B2 * | 4/2022 | Veille | B60J 1/17 |
| 2003/0182865 | A1 * | 10/2003 | Nestell | B60J 1/1861 49/374 |
| 2003/0213179 | A1 * | 11/2003 | Galer | B60J 1/1861 49/413 |
| 2005/0044799 | A1 * | 3/2005 | Kinross | E05D 15/1047 49/413 |
| 2005/0184557 | A1 * | 8/2005 | Suzuki | B60J 1/1861 296/146.16 |
| 2008/0216410 | A1 * | 9/2008 | Lahnala | B60J 1/1853 49/374 |
| 2009/0038229 | A1 * | 2/2009 | Cicala | E05F 11/486 49/374 |
| 2015/0028622 | A1 * | 1/2015 | Lahnala | B60J 10/76 49/404 |
| 2024/0424878 | A1 * | 12/2024 | Charge | B60J 10/76 |

FOREIGN PATENT DOCUMENTS

| | | |
|---|---|---|
| EP | 1612072 B1 | 1/2006 |
| EP | 1422091 B1 | 5/2006 |
| EP | 3647093 B1 | 4/2022 |
| FR | 2839020 A1 | 10/2003 |

* cited by examiner

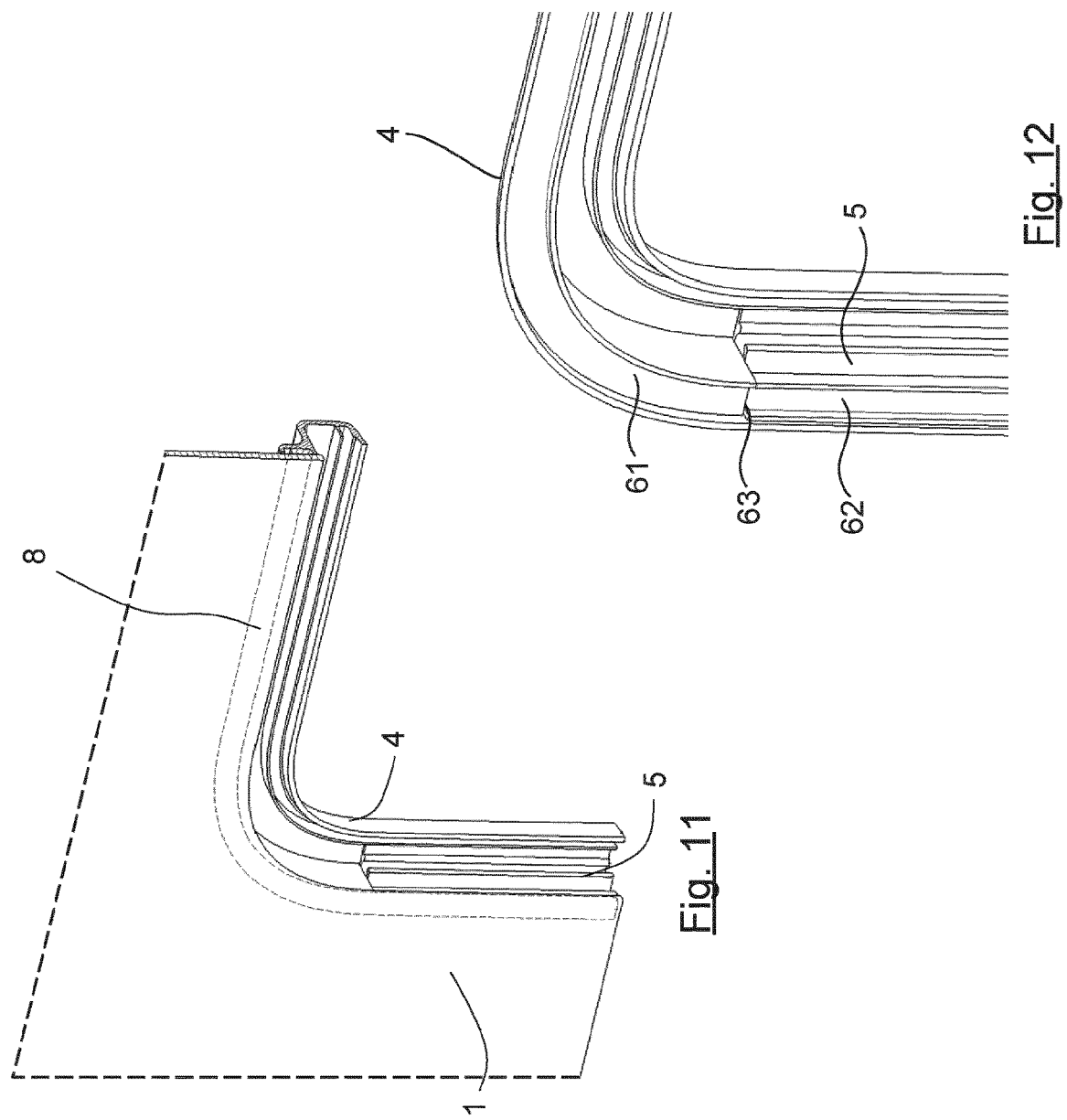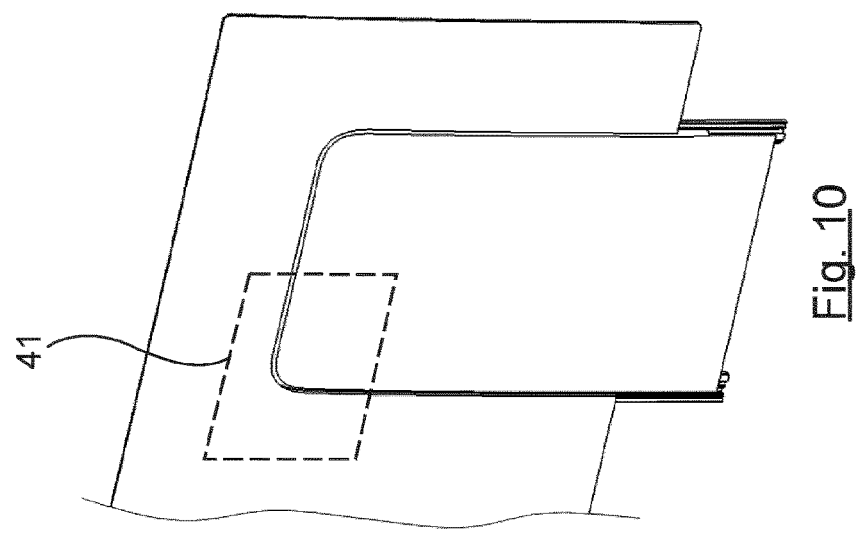

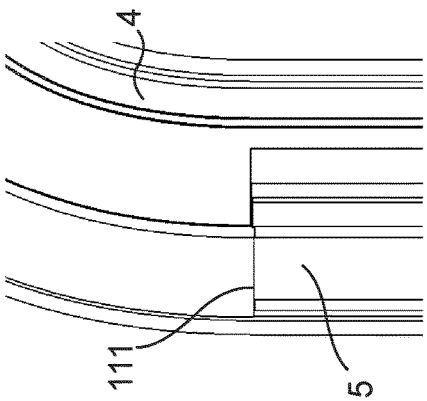
Fig. 17A
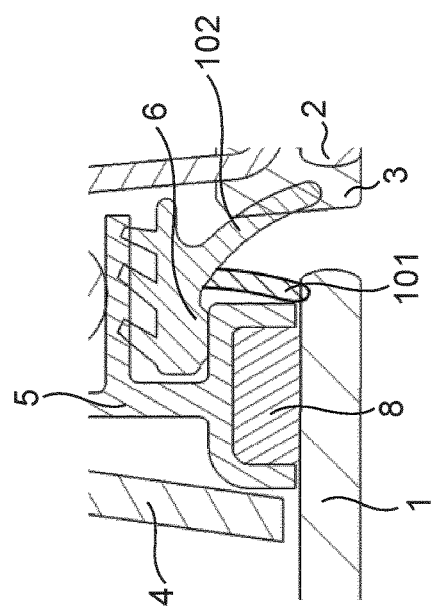
Fig. 16
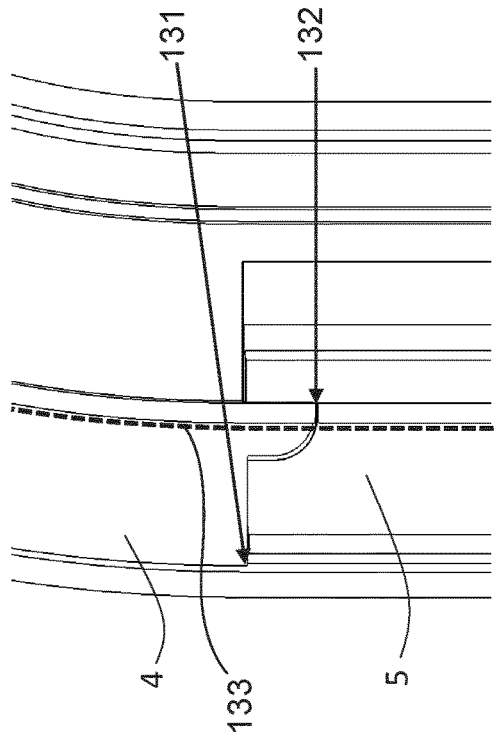
Fig. 17B
Fig. 19
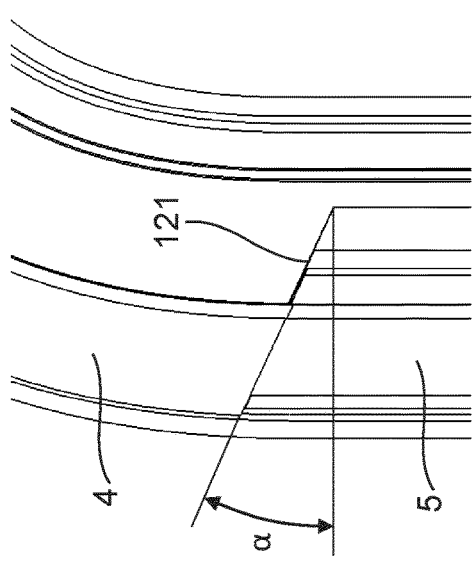
Fig. 18

SECTION A-A

SECTION B-B

GLAZED DEVICE FOR A VEHICLE DOOR, COMPRISING A FLUSH-FITTED MOVABLE PANEL, AND CORRESPONDING DOOR

1. FIELD OF THE INVENTION

The field of the invention is that of motor vehicles.

More precisely, the invention relates to the equipment of openings arranged in vehicles, and particularly vehicle doors.

In particular, the invention relates to vehicle doors equipped with at least one substantially vertically mobile glazed panel, particularly for changing from a closed position to an open position wherein it fully or partially penetrates into a lower bodywork inner panel (the mobile panel, of course, being able to generally take a plurality of intermediate positions).

Such a vehicle door may particularly be a side door, but the invention can also apply, for example, to the swing and/or sliding doors of a vehicle, including the rear doors, the tailgates, etc., or even a fixed part of the bodywork of a vehicle.

2. PRIOR ART

Examples of such devices are particularly described in the patent documents EP1422091, EP1612072 or EP3647093.

According to this approach, a frame is provided, on the side oriented towards the inside of the vehicle, supporting one or more (conventionally two) rails, cooperating with pads integral with the mobile glazed panel, and fixed on the face thereof oriented towards the inside of the vehicle. The frame may, where applicable, be truncated and be limited to struts supporting the rails.

This technique is interesting, because it makes it possible to create original designs, due to the elimination of the conventional door frame, while keeping effective guiding and holding of the mobile panel.

Devices comprising a glazed fixed part are also known, wherein an opening is arranged, which may be uncovered or covered by a mobile panel guided along rails mounted on the face of the glazed fixed part oriented towards the inside of the vehicle. The applicant has filed many patents on this approach, of which the general principle of this technique is particularly described in the patent documents EP778168 and EP857844. In this case, the mobile panel is generally mobile along a horizontal axis and with a complex movement, known as swinging.

It would be interesting, in certain situations, to combine the two approaches, namely the presence of a glazed fixed part and of a vertically mobile panel to retract at least partly in an inner door shell, and covering an opening of which three sides, two side edges and an upper edge, are defined in the fixed part. However, this combination is neither easy nor direct. Placing an opening on the lower edge of the fixed glazed panel requires a specific approach for holding and moving the mobile panel. It is essential to maximise the clear opening, and therefore reduce where possible the size of the attachment parts on the fixed part (rails, frame, etc.), the safety, the ease of assembly and mounting of the device, etc.

One major difficulty is to effectively, reliably and durably ensure the guiding of the mobile panel, and the sealing (including in the presence of a high-pressure jet).

3. OBJECTS OF THE INVENTION

In particular, the object of the invention is to mitigate these drawbacks of the prior art.

More precisely, the object of the invention, in at least one embodiment, is to provide a glazed device for producing a vehicle door, which has an effective sealing.

Another object of the invention, according to at least one embodiment, is to provide such a glazed device that offers a maximised clear opening, while being reliable and durable over time.

4. DESCRIPTION OF THE INVENTION

These objects, as well as others that will become apparent hereinafter are achieved by means of a glazed device intended to be mounted on an inner door shell to form a motor vehicle door or on a bodywork element, comprising a glazed fixed part and a mobile glazed panel that can slide relative to said fixed part along a substantially vertical axis, and can selectively at least partially cover or uncover an opening in said fixed part, said mobile panel being guided along rails supported by said fixed part.

According to the invention, said rails are secured to said fixed part along the side edges by a bead of glue, and a frame, which extends at least on the side edges and the upper edge of said opening is secured to the rails for its side edges and glued to said fixed part by means of said bead of glue, for its upper edge.

Thus, the same bead of glue ensures the securing of the fixed part of the rails, on the side edges of the opening, and of the frame, for the upper edge. This particularly makes it possible to reduce the width of the assembly formed by the frame and the rail, particularly on the side edges, and therefore to increase the clear opening. The frame may be secured to the rails (and not directly to the fixed part), at these side edges.

According to a particular feature, the device of the invention comprises means for controlling the sealing at a junction between the upper part of said rails and said frame.

Indeed, the inventors identified that the innovative approach of the invention may introduce, in some situations, a sealing problem, at the transition between the gluing of the rail and the gluing of the frame, which may require implementing specific means.

According to a first embodiment of these means for controlling the sealing, each of said rails supports a seal having at least two sealing lips, a first lip coming into contact with the rim of said mobile part and a second lip coming into contact with the edge of the fixed part, along said rail.

This approach is easy to implement, and is based on a novel and non-obvious approach of such a seal, having a lip along the rail.

According to a second embodiment of these means for controlling the sealing, a sealing bead or a seal is placed between the frame and each rail, before depositing the bead of glue, known as main bead of glue, of said rails, respectively of said frame, on said fixed part.

This makes it possible to prevent the passage of water, at the transition between the rail and the frame.

Said sealing bead may particularly comprise glue or a sealant.

According to a third embodiment of these means for controlling the sealing, the upper part of each rail has a non-zero angle relative to the horizontal, the rail portion away from said opening being higher than the rail portion close to said opening.

This particular shape of the rail makes it possible to effectively direct the water towards the outside.

Said angle is preferably greater than or equal to 25°.

According to a fourth embodiment of these means for controlling the sealing, it is provided that the upper part of said rail covers a portion of said frame.

Once again, this makes it possible to prevent the passage of water.

In particular, the upper part of said rail can be cut so that the discontinuity is lower on the side oriented towards said opening than the side oriented towards said fixed part.

In particular, said discontinuity may have a concave shape substantially in an arc of a circle.

Two, or more, of these embodiments may of course be combined if necessary.

According to another particular aspect, said frame and/or said rails may have vertical extensions, which extend beyond the lower part of said fixed part.

In particular, at least one of said extensions may support a stop ensuring that the movement of said mobile panel is limited relative to said fixed part in two directions substantially perpendicular to said substantially vertical axis, at least while said mobile panel is mounted on said fixed part.

This makes it possible to facilitate the mounting of the mobile panel.

The invention also relates to a motor vehicle comprising at least one glazed device as described above.

In particular, in such a vehicle, said covering device may be mounted in the upper part of a door of said vehicle, said mobile panel moving at least partially in a lower part of said door.

5. LIST OF FIGURES

The invention, as well as the various advantages thereof, will be understood more easily thanks to the following description, given purely by way of illustrative and non-limiting example with reference to the appended drawings, wherein:

FIG. 10 is a portion of FIG. 1, illustrating the area wherein a specific aspect of sealing is treated according to the invention;

FIG. 11 shows the portion of the frame and of the rail of FIG. 10, without the mobile panel and without the seals;

FIG. 12 shows the portion of the frame and of the rail of FIG. 10 (frame and rail only);

FIG. 16 illustrates a first sealing solution, implementing a dedicated lip of a seal;

FIGS. 17A and 17B illustrate a second sealing solution, implementing a bead or a dedicated seal;

FIG. 18 illustrates a third sealing solution, implementing an inclination between the frame and the rail;

FIG. 19 illustrates a fourth sealing solution, implementing a covering, or curl, between the rail and the frame;

6. DETAILED DESCRIPTION OF EMBODIMENTS OF THE INVENTION

6.1 General Structure

The invention therefore relates to a novel approach for mounting a glazed mobile panel and a fixed glazed part of a door (side door, rear door, tailgate, cabin door, etc.), or even a fixed part of the motor vehicle bodywork. The glazing, or mobile panel, is aligned and flush-fitted with at least one edge of the bodywork, that is to say that no frame or frame element protrudes outside of the vehicle, relative to the plane of this glazed part, and is guided so as to penetrate into the inner door shell (or an equivalent bodywork element), in a vertical direction.

Figure 1:
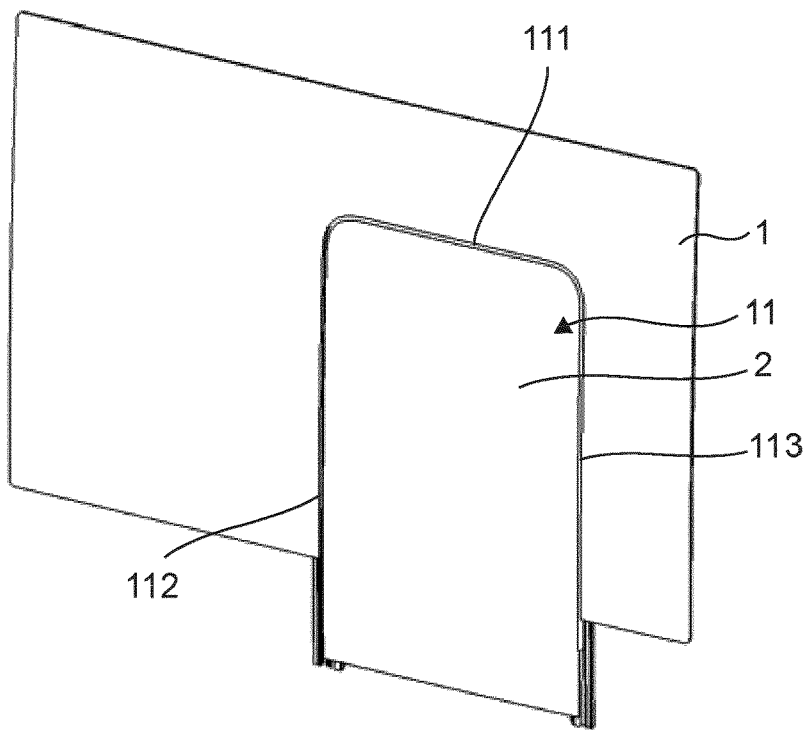
FIG. 1 and FIG. 2 are schematic sectional views of one embodiment of a glazed device of a vehicle door according to the invention, respectively seen from the side oriented towards the outside and the inside of the vehicle.
Figure 2:
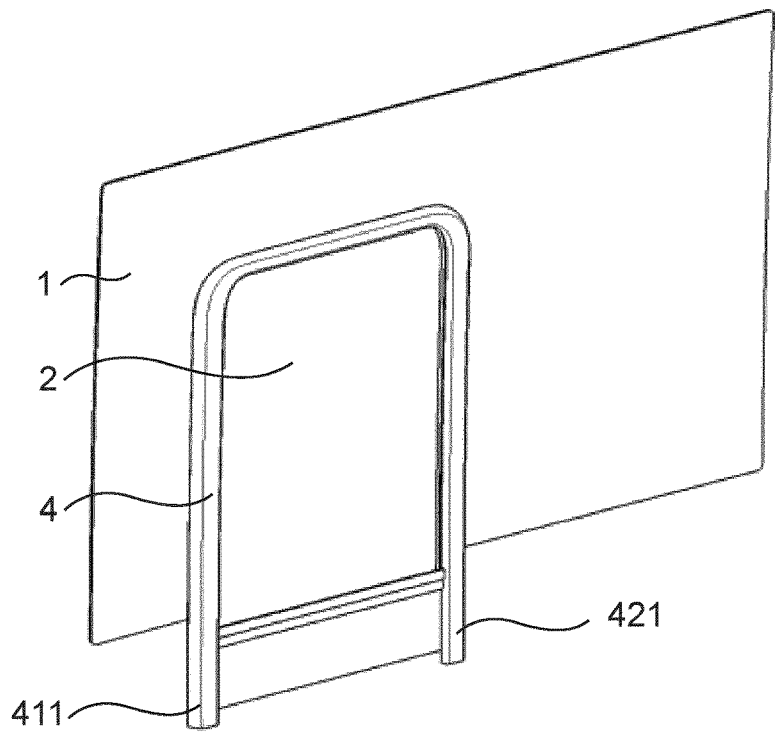

FIGS. 1 and 2 schematically illustrate such a device, seen from the side corresponding to the outside, respectively to the inside, of the vehicle. This device is intended to be secured, via the fixed part, to an inner door shell or to the bodywork of the vehicle, not shown, which extends below the device.

Figure 3:
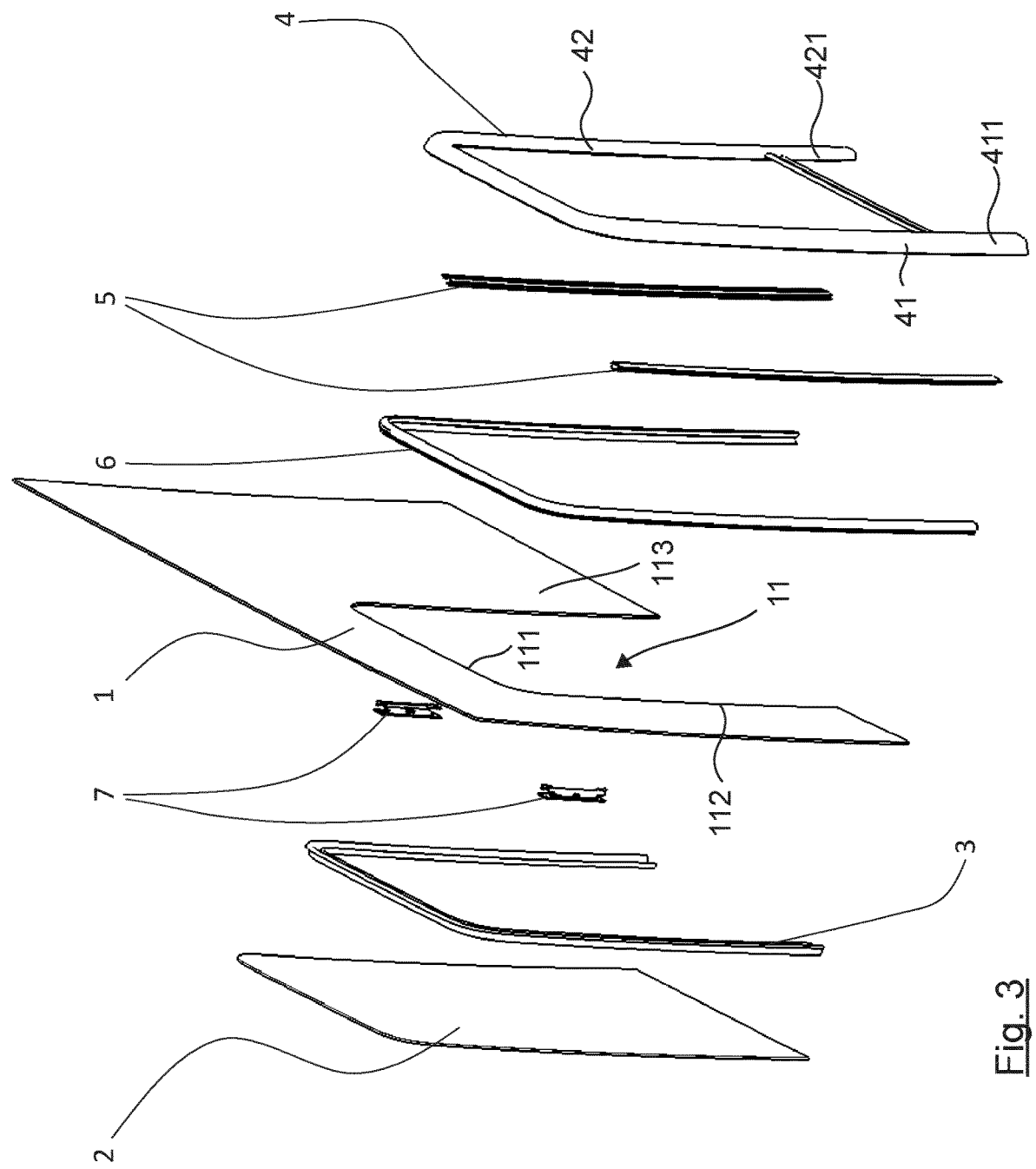
FIG. 3 is an exploded view of the main elements forming the device of FIGS. 1 and 2.

The main constituent elements of the device appear in the exploded view of FIG. 3. The device thus comprises a fixed part 1, which may particularly be a glazing in one piece of which the outer edges correspond to the edges of the upper part of the door. An opening 11 is cut in this fixed part, defined by an upper edge 111 and two vertical side edges 112 and 113 of the fixed part. The lower part of the opening is not delimited in the fixed part but formed in its lower edge, to make it possible to move the mobile panel 2.

This mobile panel 2, which may also be glazed, is therefore designed and sized to fit into the opening 11, in a closed position, and to shift downwards, typically inside the inner door shell, in an open position. This movement may for example be ensured by an electric motor and a suitable transmission (not shown) connecting the bottom part of the mobile panel 2 to the motor.

Figure 5:
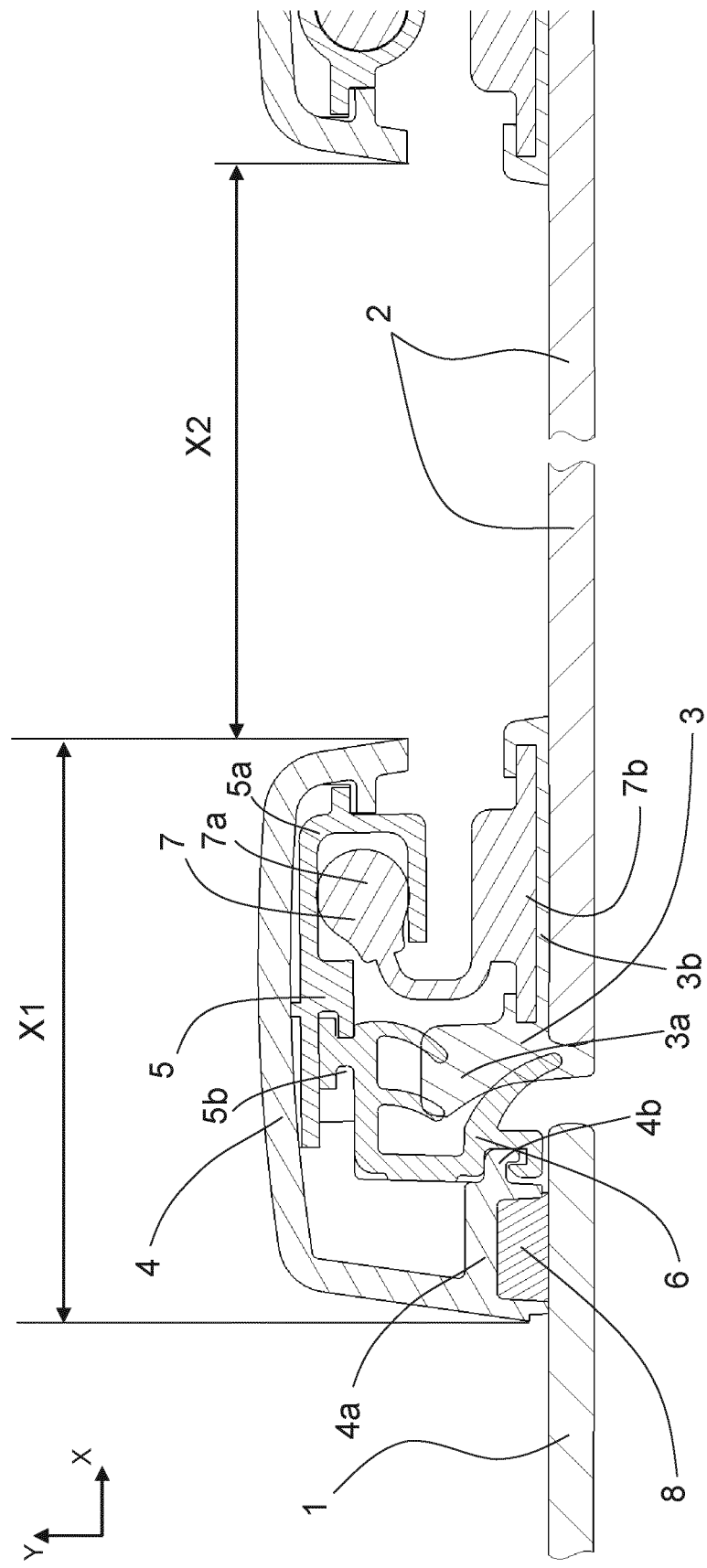
FIG. 5 is a section of the frame and of the rail of the device of FIG. 4, according to a first embodiment.
Figure 6:
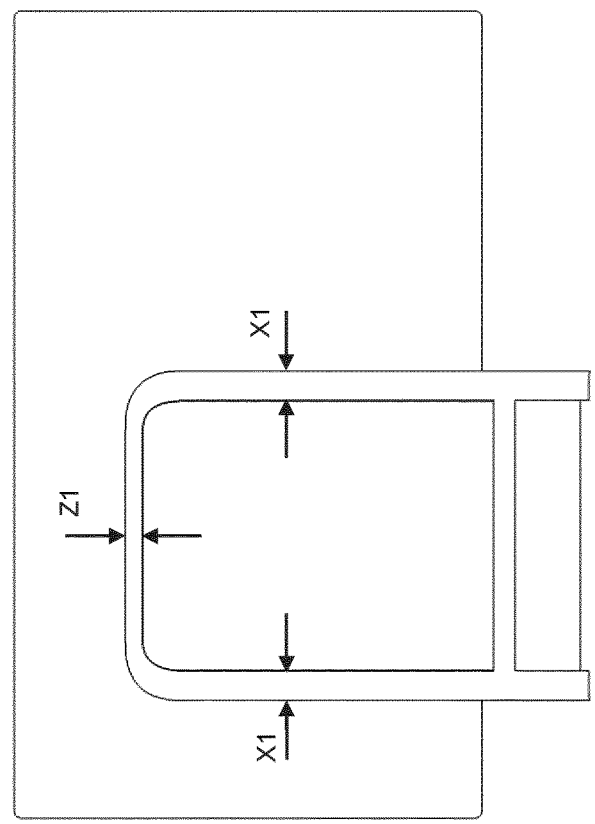
FIG. 6 is a simplified view of the device of FIGS. 1 and 2, seen from the inside, showing the location of the section of FIG. 7.

The mobile panel 2 receives an encapsulation 3, which extends in this example on the side edges and the upper edge of the panel. This encapsulation 3 may particularly extend over the rim of the mobile panel and around the periphery thereof, over the face oriented towards the inside of the vehicle, over a few millimetres or centimetres, as shown in the sections of FIGS. 5 and 6 for example, commented on hereinafter.

The fixed part 1 supports a frame 4, on its face oriented towards the inside of the vehicle, at least along the upper edge 111 and vertical side edges 112 and 113. The side portions 41, 42 of the frame support and/or are supported by rails 5, making it possible to hold and guide the mobile panel 2. As shown particularly in FIGS. 1 and 2, the frame and/or the rails extend below the fixed part 1 (parts 411 and 421).

A seal 6 is mounted in the frame 4, along its side and upper portions.

The mobile panel 2 is equipped with guide pads 7, capable of cooperating with the rails 5. They may particularly be secured directly to the encapsulation, or via an intermediate support.

Figure 8:
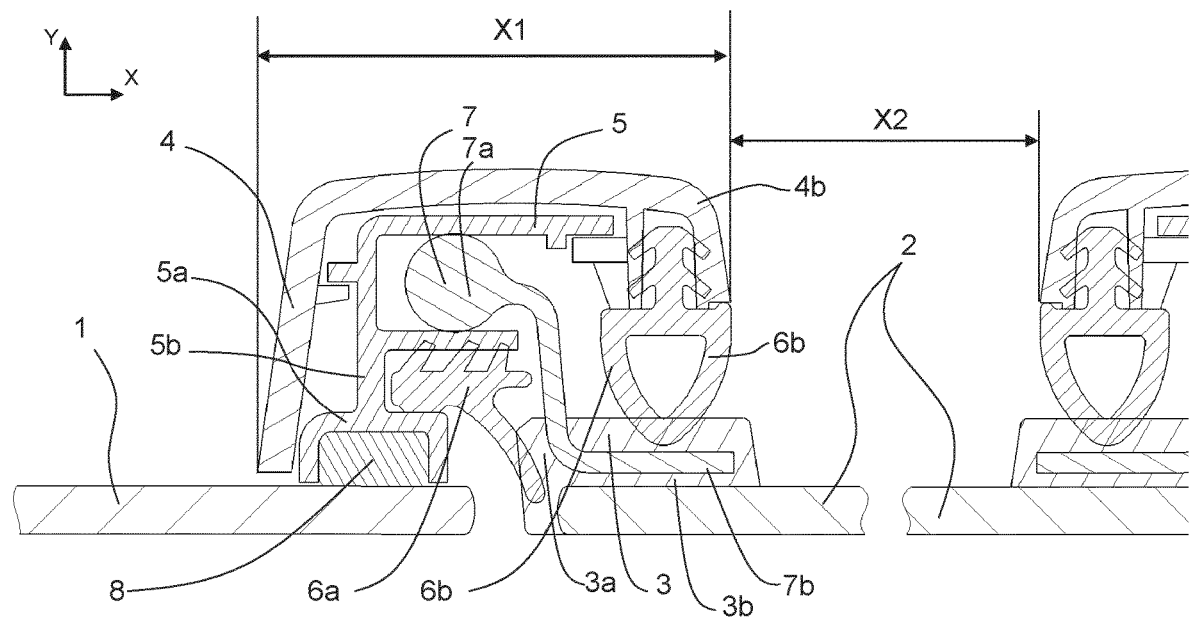
FIG. 8 is a section of the frame and of the rail of the device of FIG. 4, according to a second embodiment.

The frame and the rails are secured to the fixed part by a main bead of glue, referenced 8 in FIGS. 5 and 8.

6.3 Mounting the Rail and Frame—First Approach

Figure 4:
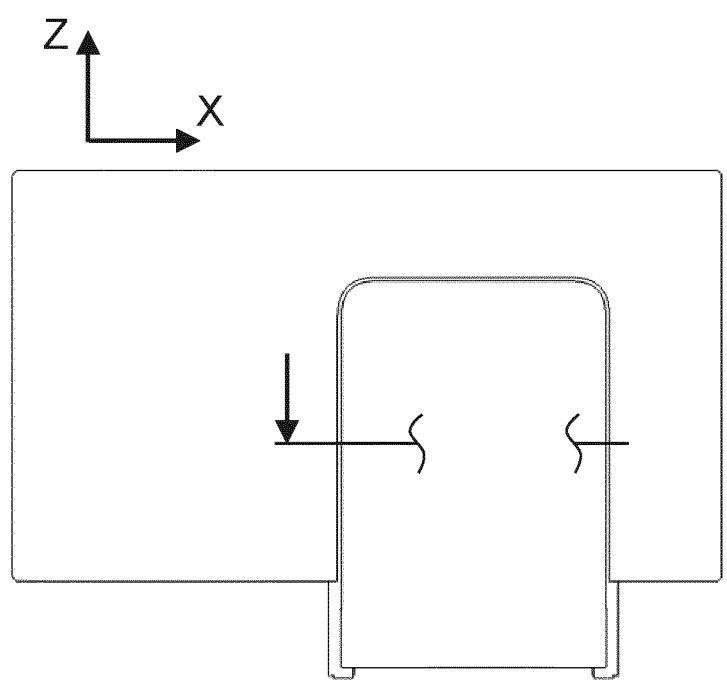
FIG. 4 is a schematic view of the device of FIGS. 1 and 2, showing the location of the section of FIG. 5.

FIG. 4 is a simplified view of the device, specifying the location of the section of FIG. 5. FIG. 5 shows a first example of design of the frame, of the rails and of the pads.

According to this approach, the frame 4 is glued to the fixed part 1, via a bead of glue 8 that fits in the recess 4a provided for this purpose. The frame 4 supports a guide rail 5.

The seal 6, which has three lips is secured on the one hand to the frame 4, via the attachment portion 4b, and on the other hand to the rail 5, via the attachment portion 5b.

The mobile panel 2 supports an encapsulation 3, of which a portion 3a extends towards the inside of the vehicle by moving away from the mobile panel, and forms a side surface and an upper surface cooperating with the lips of the seal. This portion 3a also covers the rim of the mobile panel.

A portion 3b extends around the periphery of the mobile panel 5, on its face oriented towards the inside of the vehicle, and receives an end 7b of the pad 7, so as to hold it.

In this embodiment, the pad has a generally C-shaped section. In a way it is folded back on itself, the two ends 7a and 7b being substantially superimposed, one on top of the other (according to an axis perpendicular to the plane defined by the mobile panel). This makes it possible to reduce the width X1 of the frame and therefore to benefit from a significant clear opening (X2).

Figure 7:
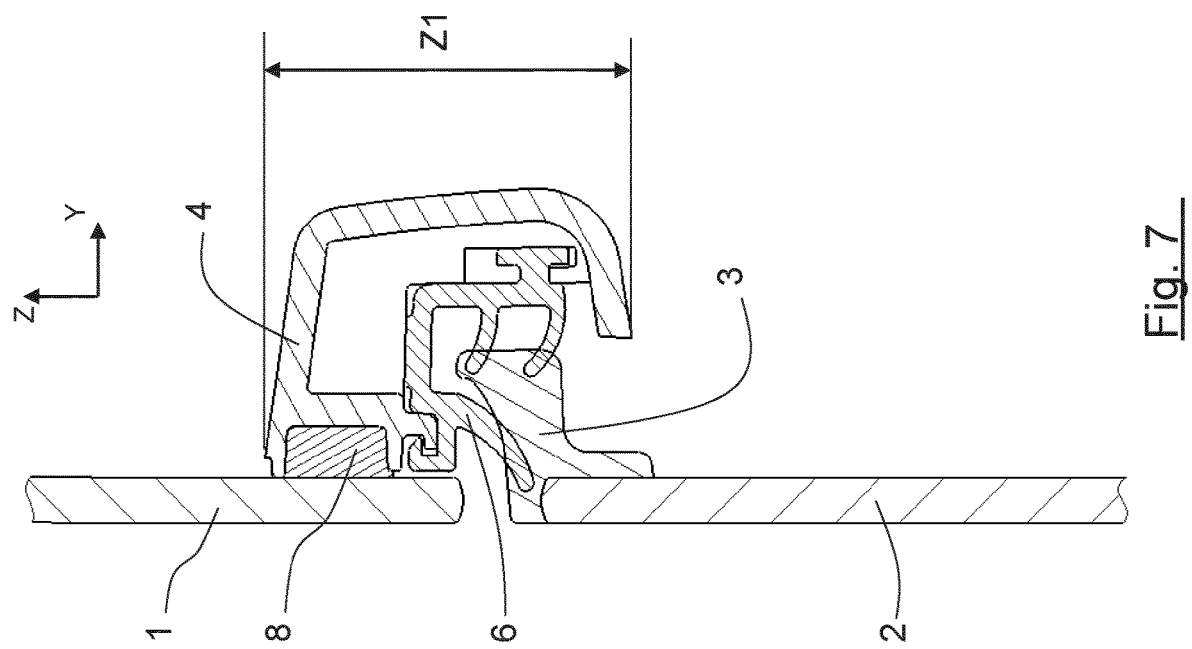
FIG. 7 is a section of the upper part of the frame of the device of FIG. 6, according to a first embodiment.

With the same objective in mind, and as illustrated by FIG. 6, it is possible that the frame is narrower (Z1) in the upper part, which does not contain a rail. According to the section of FIG. 7, it is thus noted that the width of the encapsulation 3 is reduced, as is that of the frame 4, which holds the seal 6 by its two sides.

According to this embodiment, the frame is glued to the fixed part around its entire periphery.

6.4 Mounting the Rail and Frame—Second Approach

However, it is desirable to also reduce the width of the frame. The approach illustrated by FIG. 8 (section in the location defined in FIG. 4) makes it possible to achieve this objective.

The mobile panel 2 supports an encapsulation 3, of which a portion 3a extends towards the fixed part by moving away from the mobile panel, and forms a side surface cooperating with a lip of a first seal 6a. This portion 3a also covers the rim of the mobile panel.

A portion 3b of the encapsulation extends around the periphery of the mobile panel 5, on its face oriented towards the inside of the vehicle, and receives an end 7b of the pad 7, so as to hold it.

In this implementation, the pad has a generally S-shaped section, the guide end 7a, essentially cylindrical, being shifted beyond the mobile panel 2, at least partly above the fixed part 1. Other sections are however possible in this embodiment, including the C-shaped section.

According to this second approach, the rail 5 is glued, via its part 5a forming a recess for receiving the bead of glue 8, at the fixed part. This rail 5 supports the frame 4, for example by interlocking, for the side portions of the frame. It also supports the seal 6a, via a recess 5b. This makes it possible to effectively reduce the overall width of the frame, and therefore optimise the clear opening.

The end 4b of the frame oriented towards the opening supports a second seal 6b, coming into contact with the upper part of the encapsulation 3.

Figure 9:
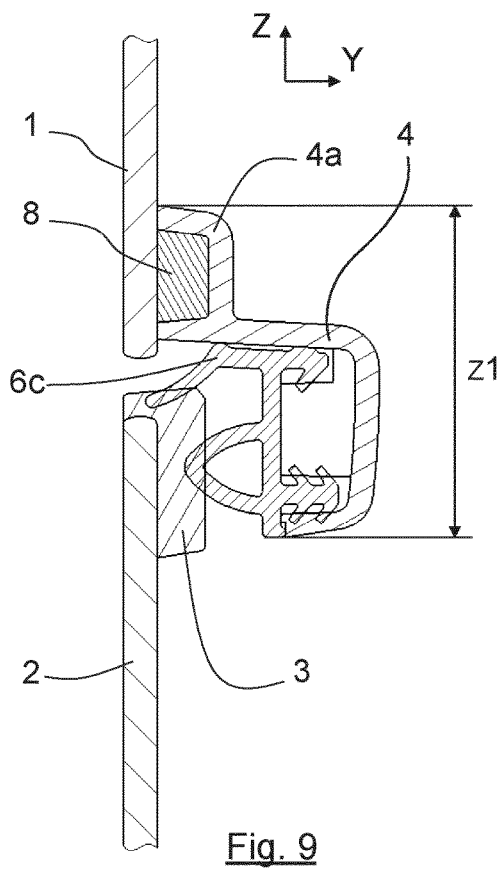
FIG. 9 is a section of the upper part of the frame of the device of FIG. 6, according to a second embodiment.

FIG. 9 illustrates the section of the upper portion of the frame, according to this second embodiment. Due to the fact that of course there is no rail on this upper portion, the frame 4 is glued directly to the fixed part 1, via the bead of glue 8 placed in the recess 4b. Only one seal 6c, of section substantially different to that of the seal 6b, is supported by the frame.

Thus, on the side parts, the rails 5 are glued to the fixed part, whereas the frame 4 is glued to the fixed part in its upper part, by the same bead of glue 8, circulating in the recesses 5b, 4b respectively.

6.5 Identifying an Infiltration Risk

The inventors identified that this solution, according to this second embodiment for mounting the frame and the rail in particular, has many advantages, but also a significant risk, due to the particular structure of the device, and more precisely due to the fact that the frame extends on three sides, whereas the rails only extend on the side edges.

FIG. 10 shows the area 41, in dotted lines, wherein this risk is identified. This area is illustrated more precisely in FIGS. 11 (view without the mobile panel and without the seals) and 12 (view of the frame and of the rail only). As particularly shown in FIG. 12, the bead of glue 8 fits into the frame 4, along the bearing face 61 of the bead of glue on the frame, in the upper part of the frame, and in the rail 5 along the bearing face 62 of the bead of glue on the rail. As the rail 5 supports the frame 4, a discontinuity 63 appears between the two bearing faces 61 and 62, with a possible gap due to mounting tolerances.

Figure 13:
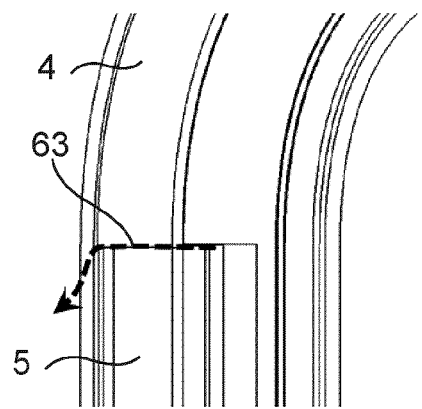
FIG. 13, FIG. 14 and FIG. 15 are various views illustrating the water infiltration risk identified by the inventors.
Figure 14:
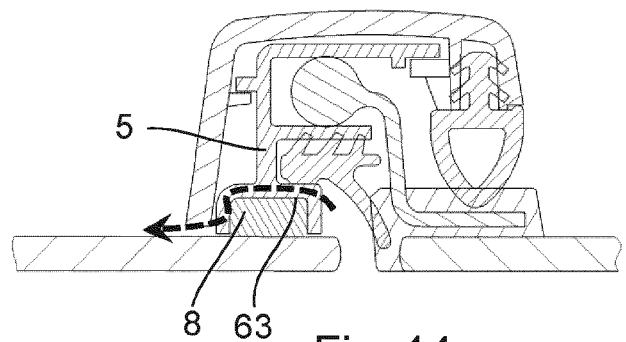
Figure 15:
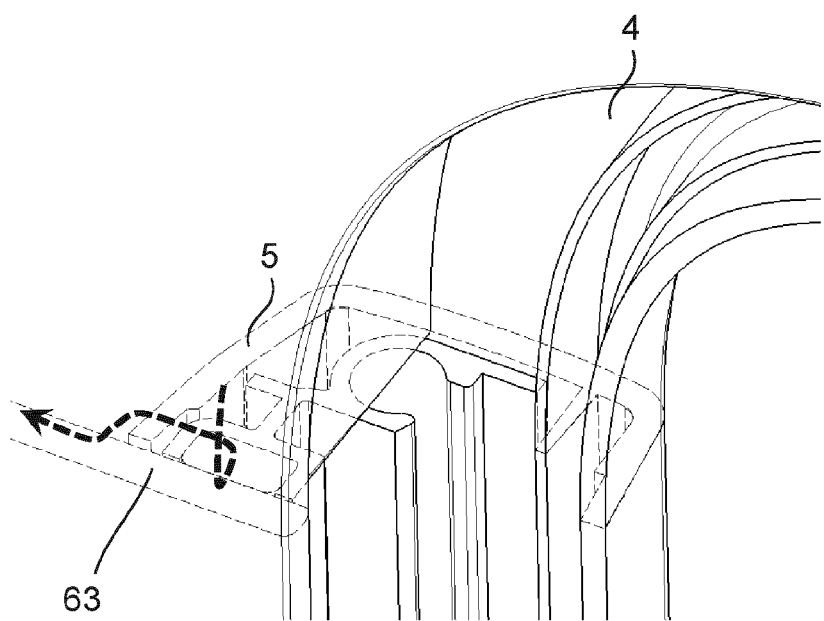

As illustrated in FIGS. 13, 14 and 15 by the arrows in dotted lines, there is a risk of water infiltrating at the discontinuity 63 between the frame 4 and the rail 5, towards the inside of the vehicle.

Identifying this problem is not obvious, the presence of a seal 6 generally appearing sufficient for the person skilled in the art, and results in an in-depth analysis by the inventors of this approach, who have consequently proposed implementing means for controlling the sealing at this discontinuity 63.

Four examples of controlling the sealing, which may of course be combined together, are described below.

6.6 First Sealing Solution

According to a first approach, illustrated in FIG. 16, it is proposed to add a second lip 101 to the seal 6, which conventionally comprises at least one lip 102 provided to come into contact with the mobile panel 2 and more precisely the encapsulation 3 that it supports. Indeed, it is conventional to provide one or more lips 102 cooperating with the mobile panel. The invention further provides at least one lip 101, which extends along the attachment of the rail (in this embodiment) to the fixed part, to come into contact with this fixed part, on its side edge, on the sealing profile. Thus, this lip reduces the infiltrations illustrated in FIG. 14.

6.7 Second Sealing Solution

According to a second solution, illustrated by FIGS. 17A and 17B, a bead or a seal 111 (different from the main bead of glue 8 subsequently received by the bearing faces 61 and 62 (FIG. 12)), which may be a bead of glue or a suitable sealant is placed, before depositing the main bead of glue. Once again, this makes it possible to effectively reduce the infiltrations.

6.8 Third Sealing Solution

According to a third solution, illustrated by FIG. 18, the junction area 121 forming the discontinuity is inclined, the part oriented towards the outside (towards the opening in the fixed part) being lower than the part oriented towards the inside, and forms an angle α of 250 or more.

6.9 Fourth Sealing Solution

Figure 20:
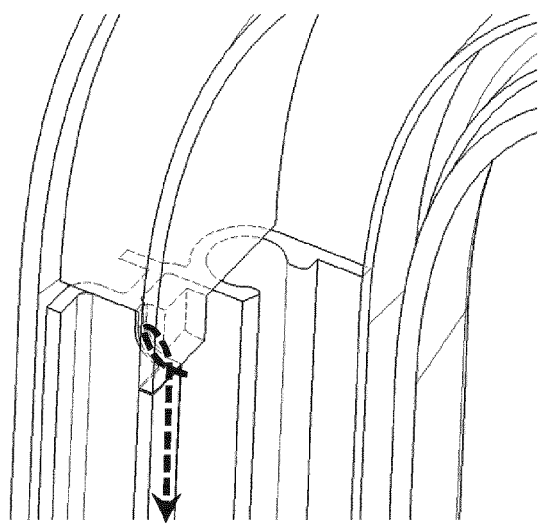
FIG. 20 and FIG. 21 are two other views of the fourth solution.
Figure 21:
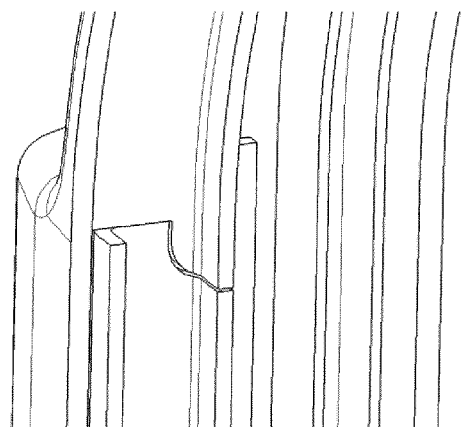

According to a fourth solution, illustrated by FIGS. 19 to 21, a covering, or curl, is implemented between the rail 5 and the frame 4, so that the discontinuity is lower on the outside (towards the opening) than on the inside. Thus, the inside water outlet area 131 is higher than the outside water inlet area 132. The dotted lines 133 illustrate the outer limit of the bead of glue 8.

This covering may have, on the side oriented towards the outside, a concave shape substantially in an arc of a circle, facilitating the discharge of the water.

FIGS. 20 and 21 illustrate this solution by means of two partially perspective views, without the mobile panel and without the seals. As can be seen by means of the arrow in dotted lines of FIG. 20, the water that infiltrates and that rises by capillarity is discharged along the rail before reaching the top point.

6.10 Blocking the Bottom Part of the Mobile Panel—First Solution

Figure 22:
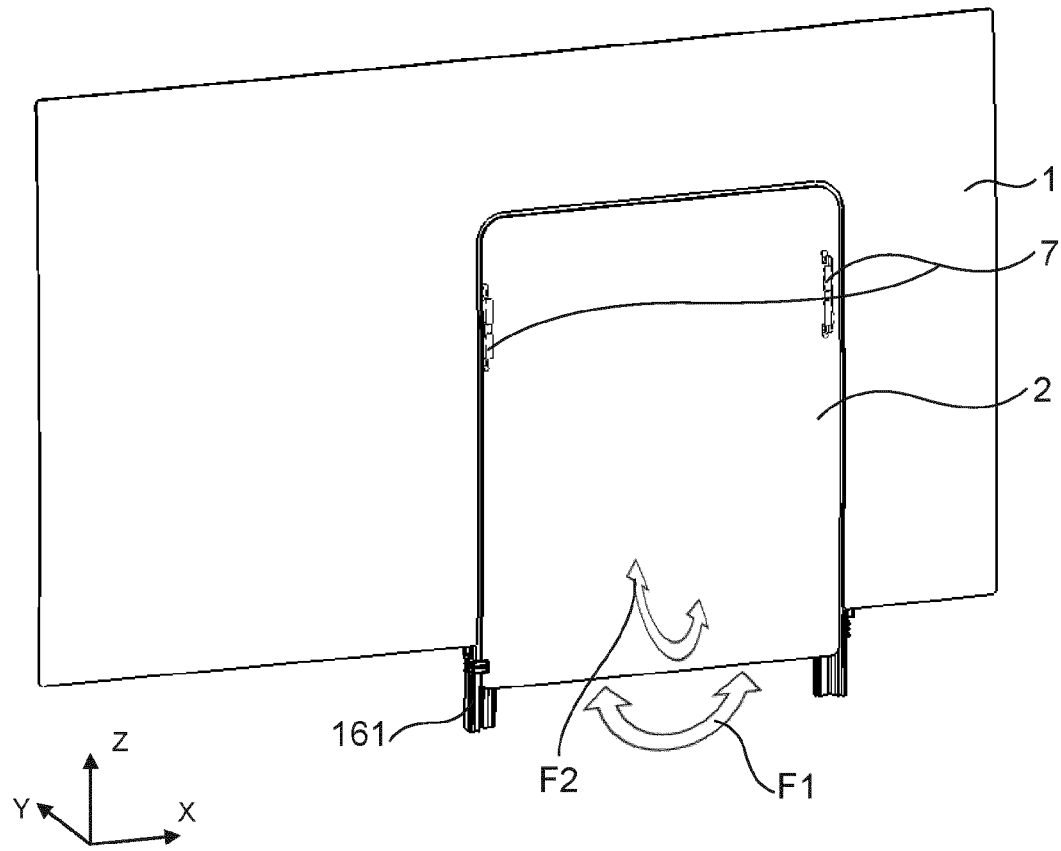
FIG. 22 shows another aspect of the invention, comprising stops for blocking the bottom part of the mobile panel.

As the mobile panel 2 is guided by two pads 7 that are located on its top part, its bottom part may be subjected, as illustrated in FIG. 22, to unintentional movements along the X (arrow F1) and Y (arrow F2) axes, due to the flexibility of the guiding, in particular during the mounting, before attaching the window lifting mechanism.

Figure 23A:
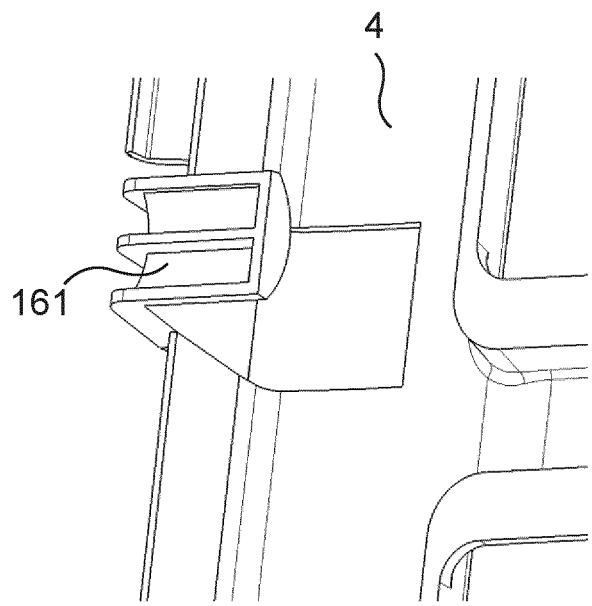
FIGS. 23A and 23B are two enlarged views of one of the stops of FIG. 16.
Figure 23B:
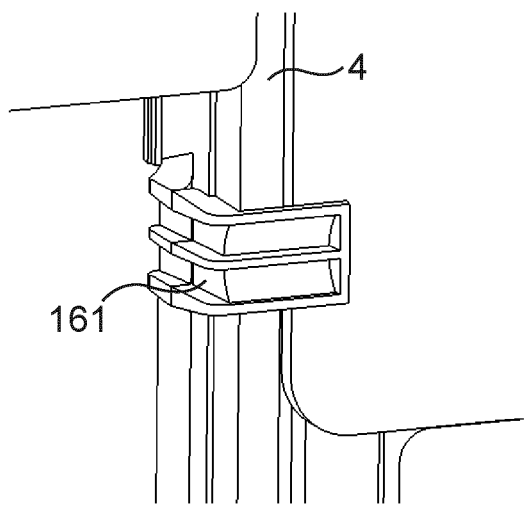

In order to prevent, or at least reduce, these unintentional movements along X and along Y, one or two stops 161 may be provided formed in the bottom part of the frame or of the rail (below the lower level of the fixed part), or secured thereto. In particular, these stops may be directly integrated into the frame 4, as illustrated in FIGS. 23A and 23B, at least on one of the sides of the frame.

6.11 Blocking the Bottom Part of the Mobile Panel—Second Solution

As illustrated in FIGS. 24 to 27, when the mobile panel 4 supports an encapsulation, it can be provided that same directly integrates one or two stops 35, 36, cooperating with the rails and/or the frame.

Figure 24:
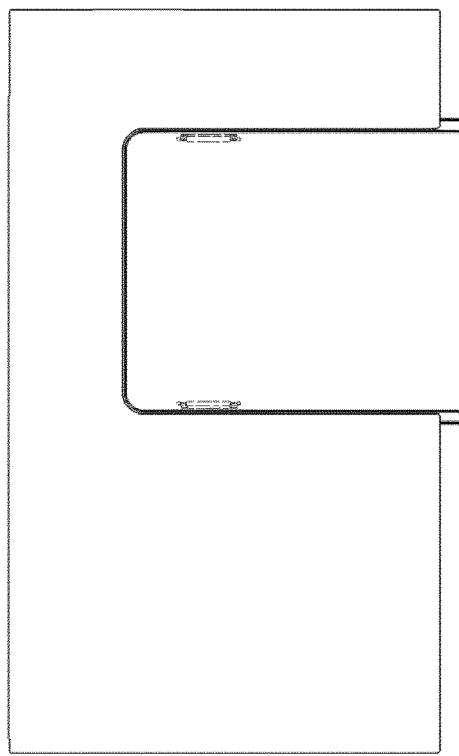
FIG. 24 is a general view of the device of the invention, implementing a second embodiment of means for blocking the bottom part of the mobile panel.
Figure 25:
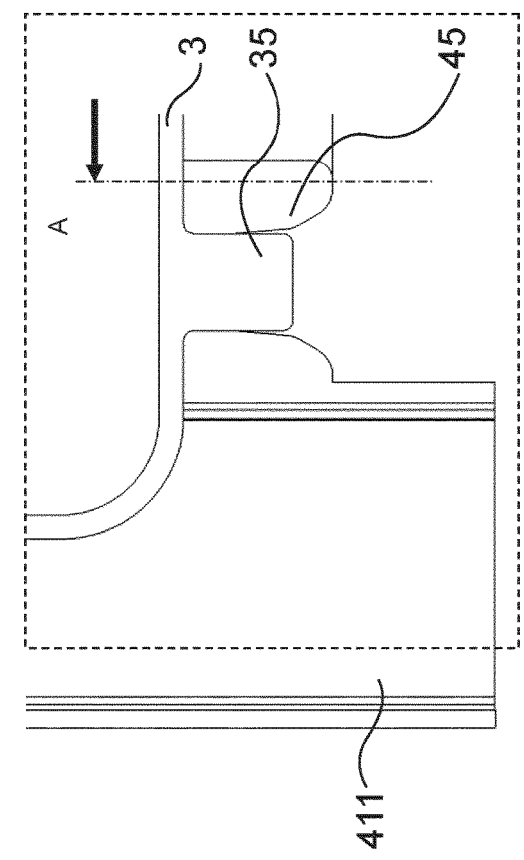
FIG. 25 shows the portion surrounded in dotted lines of FIG. 24 more precisely, showing the axis A of the section of FIG. 26.

FIG. 24 shows a general view of the device, of which the part surrounded with dotted lines is enlarged in FIG. 25. The encapsulation 3 of the mobile panel has a stop 35, cooperating with an additional element 45 integral with the fixed part, and particularly with the lower portion 411 of the frame, with a central crosspiece connecting the two side parts of the frame or of an attachment part on the rail or on the frame.

Figure 26:
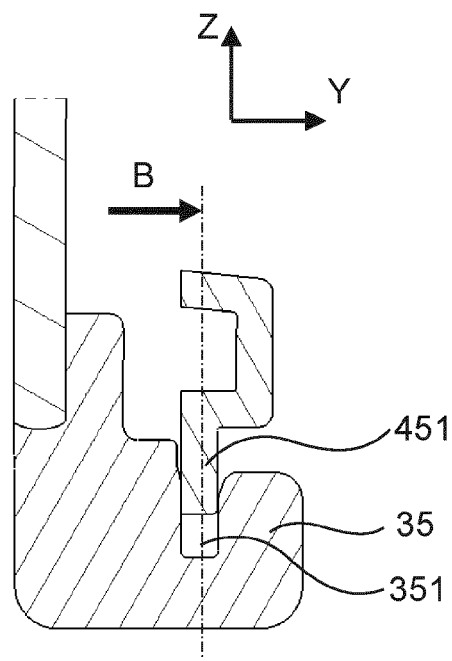
FIG. 26 illustrates the section along the axis A of FIG. 25.

As can be seen in the section A-A of FIG. 26, the blocking of the fixed panel along the Y axis is ensured by the groove 351 formed in the stop 35, cooperating with a portion 451 of the fixed part, penetrating into the groove.

Figure 27:
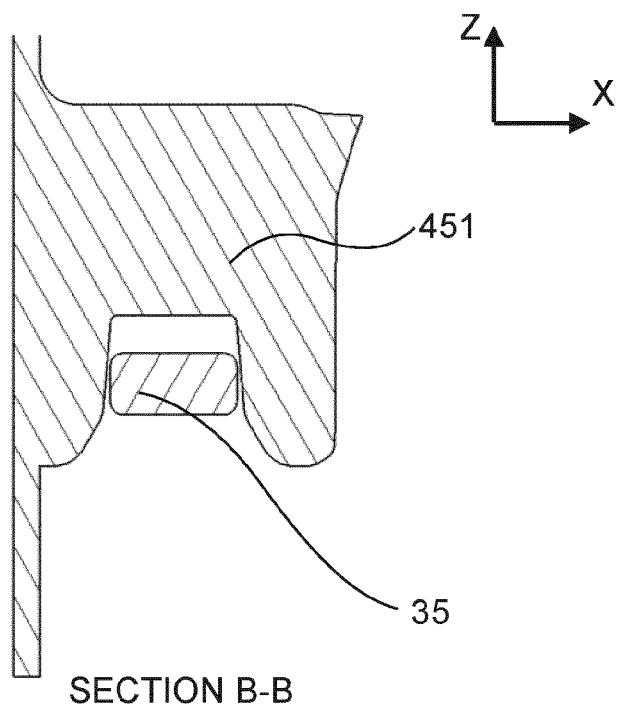
FIG. 27 illustrates the section along the axis B of FIG. 26.

The blocking of the mobile panel along the X axis is illustrated by the section B-B of FIG. 27. The stop 351 formed in the encapsulation is held in the fixed part 451.

The invention claimed is:

1. Glazed device intended to be mounted on an inner door shell to form a motor vehicle door or on a bodywork element, comprising a glazed fixed part and a mobile glazed panel that can slide relative to said fixed part along a substantially vertical axis, and can selectively at least partially cover or uncover an opening in said fixed part, said mobile panel being guided along rails supported by said fixed part and said opening being defined by an upper edge and two vertical side edges,
   characterized in that said rails are secured to said fixed part along said side edges of said opening by a main bead of glue,
   and in that a frame, which extends at least on said side edges and said upper edge of said opening, is secured to said rails for the side edges of said frame and glued to said fixed part by means of said main bead of glue, for the upper edge of said frame.

2. Device according to claim 1, characterized in that said device comprises means for controlling the sealing at a junction between the upper part of said rails and said frame.

3. Device according to claim 2, characterized in that each of said rails supports a seal having at least two sealing lips, a first lip coming into contact with a rim of said mobile panel and a second lip coming into contact with the edge of said fixed part, along said rail.

4. Device according to claim 2, characterized in that a sealing bead or a seal distinct from said main bead of glue is placed between the frame and each of said rails, before depositing said main bead of glue, of said rails, respectively of said frame, on said fixed part.

5. Device according to claim 4, characterized in that said sealing bead comprises glue or a sealant.

6. Device according to claim 2, characterized in that the upper part of each rail has a non-zero angle relative to the horizontal, a rail portion away from said opening being higher than a rail portion close to said opening.

7. Device according to claim 6, characterized in that said angle is greater than or equal to 25°.

8. Device according to claim 2, characterized in that the upper part of said rail covers a portion of said frame.

9. Device according to claim 8, characterized in that the upper part of said rail is cut so that the discontinuity is lower on the side oriented towards said opening than the side oriented towards said glazed fixed part.

10. Device according to claim 9, characterized in that said discontinuity has a concave shape substantially in an arc of a circle.

11. Device according to claim 1, characterized in that said frame and/or said rails have vertical extensions, which extend beyond the lower part of said fixed part.

12. Device according to claim 11, characterized in that at least one of said extensions supports a stop ensuring that the movement of said mobile panel is limited relative to said fixed part in two directions substantially perpendicular to said substantially vertical axis, at least while said mobile panel is mounted on said fixed part.

13. Motor vehicle characterized in that said vehicle comprises at least one glazed device according to claim 1.

14. Vehicle according to claim 13, characterized in that said covering device is mounted in the upper part of a door of said vehicle, the mobile panel moving at least partially in a lower part of said door.

* * * * *